US008406697B2

(12) United States Patent
Arimura et al.

(10) Patent No.: US 8,406,697 B2
(45) Date of Patent: Mar. 26, 2013

(54) WIRELESS COMMUNICATIONS SYSTEM FOR TOOL

(75) Inventors: Tadashi Arimura, Kyoto (JP); Hiroyuki Kaizo, Neyagawa (JP)

(73) Assignee: Panasonic Electric Works Power Tools Co., Ltd., Shiga (JP)

( * ) Notice: Subject to any disclaimer, the term of this patent is extended or adjusted under 35 U.S.C. 154(b) by 390 days.

(21) Appl. No.: 12/659,043

(22) Filed: Feb. 24, 2010

(65) Prior Publication Data

US 2010/0216415 A1 Aug. 26, 2010

(30) Foreign Application Priority Data

Feb. 24, 2009 (JP) ................................ 2009-041503
Feb. 24, 2009 (JP) ................................ 2009-041504

(51) Int. Cl.
*H04B 7/00* (2006.01)

(52) U.S. Cl. ....... 455/66.1; 455/431; 455/466; 455/423; 455/435.1; 340/870.02; 340/854.6; 364/474; 364/174; 173/180; 173/183; 173/217

(58) Field of Classification Search ................ 455/66.1, 455/431, 466, 423, 435.1
See application file for complete search history.

(56) References Cited

U.S. PATENT DOCUMENTS 5,563,482 A * 10/1996 Shaw et al. ................... 318/272
5,916,287 A * 6/1999 Arjomand et al. ........... 701/33.2
6,055,484 A * 4/2000 Lysaght .......................... 702/41
6,845,279 B1 * 1/2005 Gilmore et al. ............... 700/115
6,885,875 B1 4/2005 Benz et al.
6,899,178 B2 * 5/2005 Tubel ............................ 166/313
7,155,986 B2 * 1/2007 Kawai et al. ............... 73/862.21
RE41,160 E * 3/2010 Gilmore et al. ............... 700/115
RE41,185 E * 3/2010 Gilmore et al. ............... 700/115
7,676,945 B2 * 3/2010 Prestidge et al. ............... 33/559
7,703,330 B2 * 4/2010 Miyazaki et al. ............... 73/761
7,769,508 B2 * 8/2010 Brozovich ................... 701/31.5
7,770,658 B2 * 8/2010 Ito et al. ............................ 173/1
8,108,055 B2 * 1/2012 Wong ................................ 700/1
2004/0147281 A1 7/2004 Holcombe et al.
2007/0120953 A1 5/2007 Koga et al.
2008/0312584 A1 12/2008 Montgomery et al.
2010/0170370 A1 7/2010 Kokoyama et al.

FOREIGN PATENT DOCUMENTS

CN 1183700 A 6/1998
CN 1324527 A 11/2001
JP 2983124 11/1999
JP 2002-024945 1/2000

(Continued)

OTHER PUBLICATIONS

Office Action issued on May 22, 2012 in corresponding Chinese application No. 2010 10125262.2.

(Continued)

*Primary Examiner* — Marceau Milord
(74) *Attorney, Agent, or Firm* — Bacon & Thomas, PLLC

(57) ABSTRACT

A wireless communications system includes a tool having a first wireless communications unit and a transceiver having a second wireless communications unit to receive a signal transmitted from the first wireless communications unit. Further, the transceiver has a setting unit for setting wireless communications parameters for wireless communications between the first and the second wireless communications unit, and the tool has a tool control unit for setting in the wireless communications unit the wireless communications parameters set by the setting unit and transmitted to the tool by wireless communication.

14 Claims, 16 Drawing Sheets

FOREIGN PATENT DOCUMENTS

| | | | |
|---|---|---|---|
| JP | 2001-093071 | A | 4/2001 |
| JP | 2001-093072 | A | 4/2001 |
| JP | 2007-110670 | A | 4/2007 |
| JP | 2007-166094 | A | 6/2007 |
| JP | 2008-307670 | A | 12/2008 |

OTHER PUBLICATIONS

Office Action issued on Nov. 13, 2012 in corresponding Japanese application No. 2009-041503.

Search Report issued on Jan. 2, 2013 in corresponding European application No. 10001852.2-1249.

* cited by examiner

FIG. 5A

| FREQUENCY SETTING | USABLE FREQUENCY | REMARKS |
|---|---|---|
| CH 0 | 2405 MHz | REGISTRATION |
| CH 1 | 2415 MHz | OPERATION COMPLETION |
| CH 2 | 2425 MHz | OPERATION COMPLETION |
| CH 3 | 2435 MHz | OPERATION COMPLETION |
| CH 4 | 2445 MHz | OPERATION COMPLETION |
| CH 5 | 2455 MHz | OPERATION COMPLETION |

FIG. 5B

| TRANSMISSION OUTPUT POWER SETTING | TRANSMISSION OUTPUT POWER | REMARKS |
|---|---|---|
| 0 | 0 Bm | REGISTRATION |
| 1 | 1 dBm | OPERATION COMPLETION |
| 2 | 2 dBm | OPERATION COMPLETION |
| 3 | 3 dBm | OPERATION COMPLETION |
| 4 | 4 dBm | OPERATION COMPLETION |
| 5 | 5 dBm | OPERATION COMPLETION |

FIG. 5C

| NUMBER OF RETRANSMISSIONS SETTING | NUMBER OF RETRANSMISSIONS |
|---|---|
| 0 | 0 |
| 1 | 3 |
| 2 | 6 |
| 3 | 9 |
| 4 | 12 |
| 5 | INFINITE |

WIRELESS COMMUNICATIONS SYSTEM FOR TOOL

FIELD OF THE INVENTION

The present invention relates to a wireless communications system for a tool; and, more particularly, to the setting of wireless communications parameters including wireless communications frequency, transmission output power and the like.

BACKGROUND OF THE INVENTION

In a factory where a screw tightening operation is performed by using a tool, the screw tightening operation has been managed by controlling a tightening torque by the tool and transmitting a signal for the completion of tightening at a required torque to a management device. In this case, it is preferable to use wireless communications as shown in Japanese Patent No. 2983124 and Japanese Patent Application Publication No. 2000-024945 rather than wire communications because the wire communications negatively affects the convenience of the tool.

However, there is possibility that there are various kinds of environmental noises, such as wireless LAN and the like, in the factory, thereby causing communications errors due to such noises during the wireless communications. However, conventionally, a wireless communications frequency has to be fixed and cannot be changed in the field and, thus, it is required to make the wireless communications frequency changeable.

Accordingly, there has been proposed to set and change a wireless communications frequency by a DIP switch. However, if many setting switches, including a DIP switch and the like, are provided with the tool, there can be a high possibility of a tool operation failure due to intrusion of foreign material such as iron powder and the like depending on the surrounding environment.

Moreover, in order to eliminate the necessity of providing setting switches for the tool, there has been proposed to use a personal computer (hereinafter, referred to as PC) to set a wireless communications frequency or the ID number of a transceiver by the PC. However, in such a case, when a plurality of tools is used in the factory, each of the tools needs to be connected to the PC to change the settings of all the tools, thus entailing an extremely poor working efficiency.

SUMMARY OF THE INVENTION

In view of the above, the present invention provides a wireless communications system for a tool which can easily change settings of wireless communications parameters including a wireless communications frequency and the like.

In accordance with an embodiment of the present invention, there is provided a wireless communications system including: a tool having a first wireless communications unit; and a transceiver having a second wireless communications unit to receive a signal transmitted from the first wireless communications unit, wherein the transceiver has a setting unit for setting wireless communications parameters for wireless communications between the first and the second wireless communications unit, and the tool has a tool control unit for setting in the wireless communications unit the wireless communications parameters set by the setting unit and transmitted to the tool by wireless communication.

In this configuration, the setting unit for the wireless communications parameters is provided in the transceiver which can keep its installation environment in a good condition, and further, the wireless communications parameters set by the setting unit can be easily set to the tool by wireless communication. In addition, the setting unit is not affected by the surrounding environment of the tool.

In accordance with another embodiment of the present invention, there is provided a wireless communications system including: a tool having a first wireless communications unit; and a transceiver having a second wireless communications unit to receive a signal transmitted from the first wireless communications unit, wherein the tool has a setting unit for setting wireless communications parameters for wireless communications between the first and the second wireless communications unit, the setting unit is a remote controller for the tool, and the transceiver has a transceiver control unit for setting in the second wireless communications unit the wireless communications parameters set by the setting unit and transmitted to the transceiver by wireless communications.

In this configuration, the setting unit for the wireless communications parameters is provided in the remote controller for the tool, and further, the wireless communications parameters set by the setting unit can be easily set to the transceiver by wireless communication. In addition, the setting unit is not affected by the surrounding environment of the tool.

Further, a dedicated frequency may be used to transmit the wireless communications parameters. Therefore, even if same systems are operated, interference with each other during normal operations can be eliminated.

Further, the wireless communications parameters may be transmitted at a transmission output power lower than that that of normal communications. Therefore, it is possible to suppress interferences with other systems using different frequency bands and to avoid adverse effects on other systems.

The wireless communications may include the number of retransmissions. An appropriate number of retransmissions can be set depending on operations.

Additionally, the transceiver may communicate with a plurality of tools having their respective identification numbers, the tools can be managed by a single transceiver, the number of installed transceivers and the transceiver installation space can be reduced, and a cost-saving can be achieved.

BRIEF DESCRIPTION OF THE DRAWINGS

The objects and features of the present invention will become apparent from the following description of embodiments, given in conjunction with the accompanying drawings, in which:

FIGS. 5A to 5C are tables describing wireless communications parameters;

DETAILED DESCRIPTION OF THE EMBODIMENTS

Hereinafter, embodiments of the present invention will be described with reference to FIGS. 1A to 9 which form a part hereof.

First Embodiment

Figure 3:
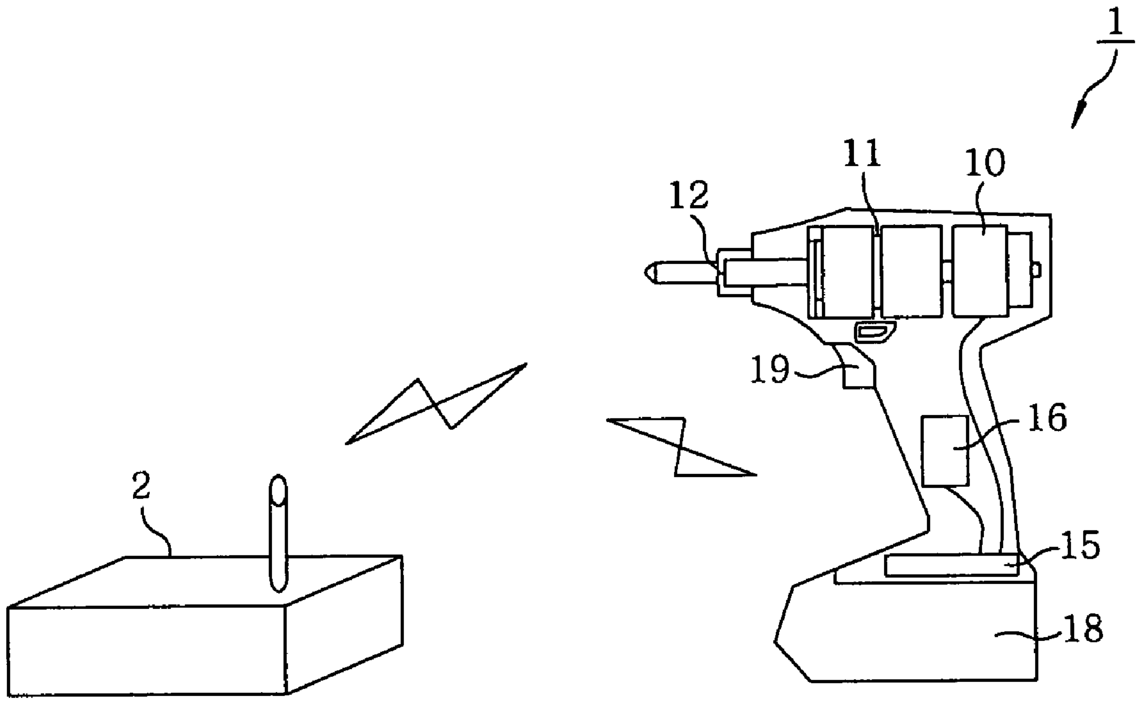
FIG. 3 is a schematic view of the first embodiment of the present invention.
Figure 4:
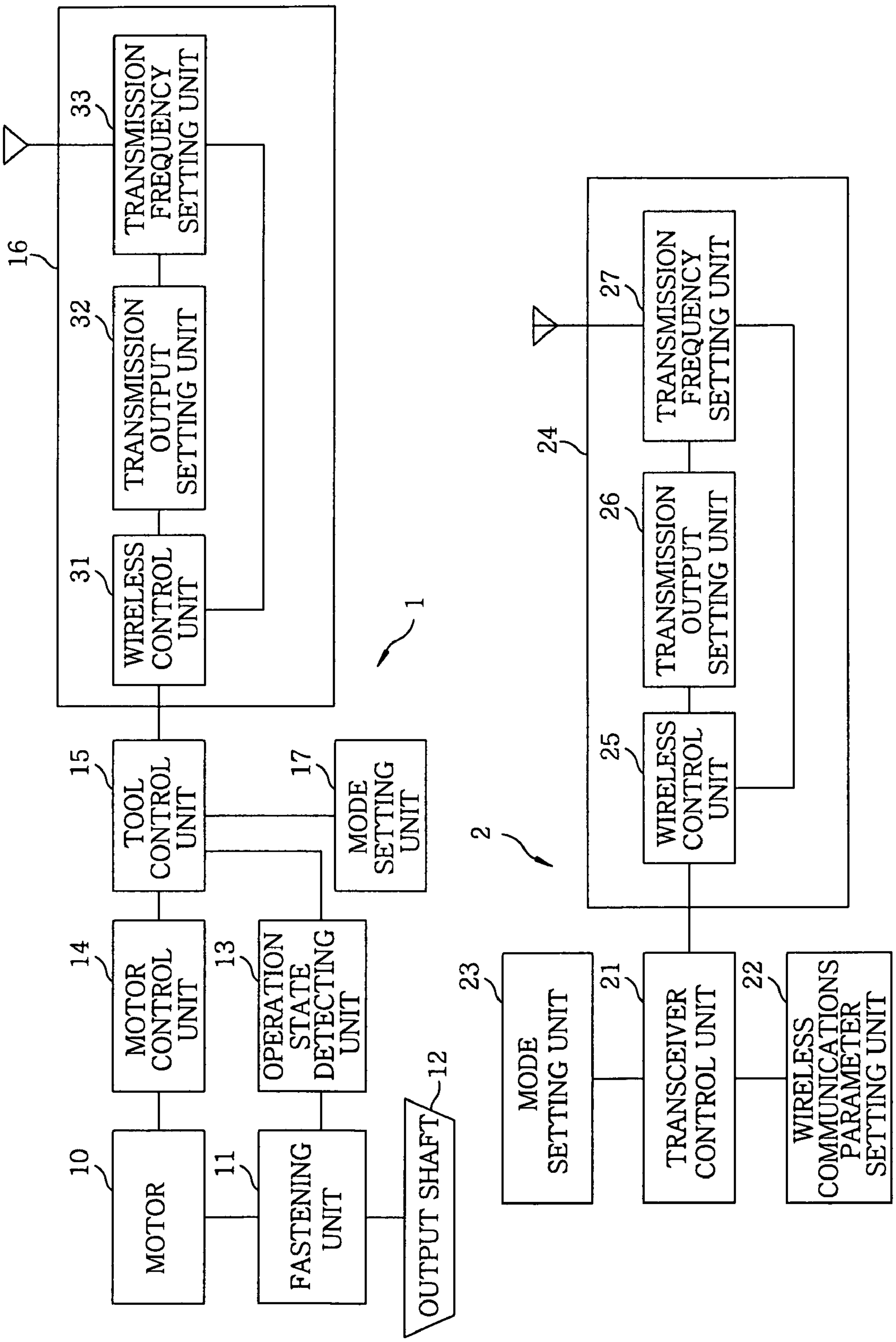
FIG. 4 is a block circuit diagram of the first embodiment of the present invention.

In a first embodiment of the present invention, an electric impact driver serves as a tool 1 in an illustrated example. As shown in FIGS. 3 and 4, the impact driver 1 includes a motor 10 as a rotational power source; a fastening unit 11 having a striking mechanism provided with a hammer and an anvil and outputting a rotation output of the motor 10, as a rotating stroke, to an output shaft 12; an operation state detecting unit 13 for detecting the state of a screw tightening operation by the fastening unit 11; a tool control unit 15 for controlling the operation of the motor 10 via a motor control unit 14; a wireless communications unit 16; and a mode setting unit 17. The impact driver 1 operates using as a power source a secondary battery in a battery pack 18 detachably attached to the impact driver 1. Reference numeral 19 shown in FIG. 3 is a trigger switch that turns on and off of the motor 10 and adjusts rpm (revolutions per minute) of the motor 10 by varying a voltage applied thereto by the operation amount thereof.

The wireless communications unit 16 can change a transmission frequency as well as a transmission output power, and includes a wireless control unit 31 for performing transmission and reception, a transmission output power setting unit 32 for changing the transmission output power, and a transmission frequency setting unit 33 for changing the transmission frequency.

The operation state detecting unit 13 detects a tightening torque by detecting strokes of the hammer on the anvil and counting the number of strokes. Upon determination of the completion of the screw tightening, the tool control unit 15 stops the motor 10 and outputs an operation completion signal to the outside through the wireless communications unit 16. Further, the operation state detecting unit 13 may be a torque sensor or a detector for detecting an amount of the rotation angle of the output shaft 12.

As shown in FIGS. 1A to 2C, the operation completion signal transmitted from the wireless communications unit 16 is a signal that includes operation completion identification data, a tool ID number of the tool 1, and a transceiver ID number of a transceiver 2. Here, the tool ID number is a unique ID number given to the tool 1 when the tool 1 was shipped from a factory. The tool ID number is stored in a nonvolatile memory in the tool control unit 15 and the transceiver ID number is stored in the nonvolatile memory in a registration mode to be described later.

Meanwhile, in a management device that carries out the management of a screw tightening operation, the transceiver 2 receives the operation completion signal transmitted from the wireless communications unit 16 and includes a transceiver control unit 21, to which a wireless communications parameter setting unit 22 and a mode setting unit 23 are connected, and a wireless communications unit 24 as shown in FIG. 4. Similar to the wireless communications unit 16 of the tool 1, the wireless communications unit 24 can change a transmission frequency as well as a transmission output power, and includes a wireless control unit 25 for performing transmission and reception, a transmission output power setting unit 26 for changing the transmission output power, and a transmission frequency setting unit 27 for changing the transmission frequency.

Here, the mode setting units 17 and 23 are respectively provided in the tool 1 and the transceiver 2 to switch between a normal communications mode and a registration mode for performing registration processing. The wireless communications parameters for wireless communications between the two wireless communications units 16 and 24 are set during the registration mode. Examples of the wireless communications parameters are shown in FIGS. 5A to 5C. Here, a set of wireless communications parameters includes a usable frequency, a transmission output power, and the number of retransmissions.

First, an operation in the normal communications mode will be described with reference to FIGS. 1A to 2C. When the tool 1 is powered on, a tool ID number stored when shipped from the factory, a transceiver ID number stored during the previous registration, an usable transmission frequency (frequency used to transmit an operation completion signal), a signal transmission output power (transmission output power for transmitting the operation completion signal), and the number of retransmissions (the number of transmissions of the operation completion signal to the transceiver) are read out from the nonvolatile memory in the tool control unit 15 to transmit the usable transmission frequency and the signal transmission output power to the wireless control unit 25 (step S8). Based on these, the wireless control unit 25 sets the transmission output power by the transmission output power setting unit 26, and sets the transmission frequency by the transmission frequency setting unit 27.

Then, if a registration mode switch, which is the mode setting unit 17, is not ON (No in step S10), the tool control unit 15 stops the motor 10 (step S11) when the trigger switch 19 is OFF in step S12, while the tool control unit 15 drives the motor 10 when the trigger switch 19 is ON in step S12. If an operation completion determination is detected by the operation state detecting unit 13 (Yes in step S13), the motor 10 is stopped in step S14, and, as stated above, an operation completion signal is transmitted from the wireless communications unit 16 in step S15. If the answer is NO in step S13, the process returns to step S12.

Figure 2A:
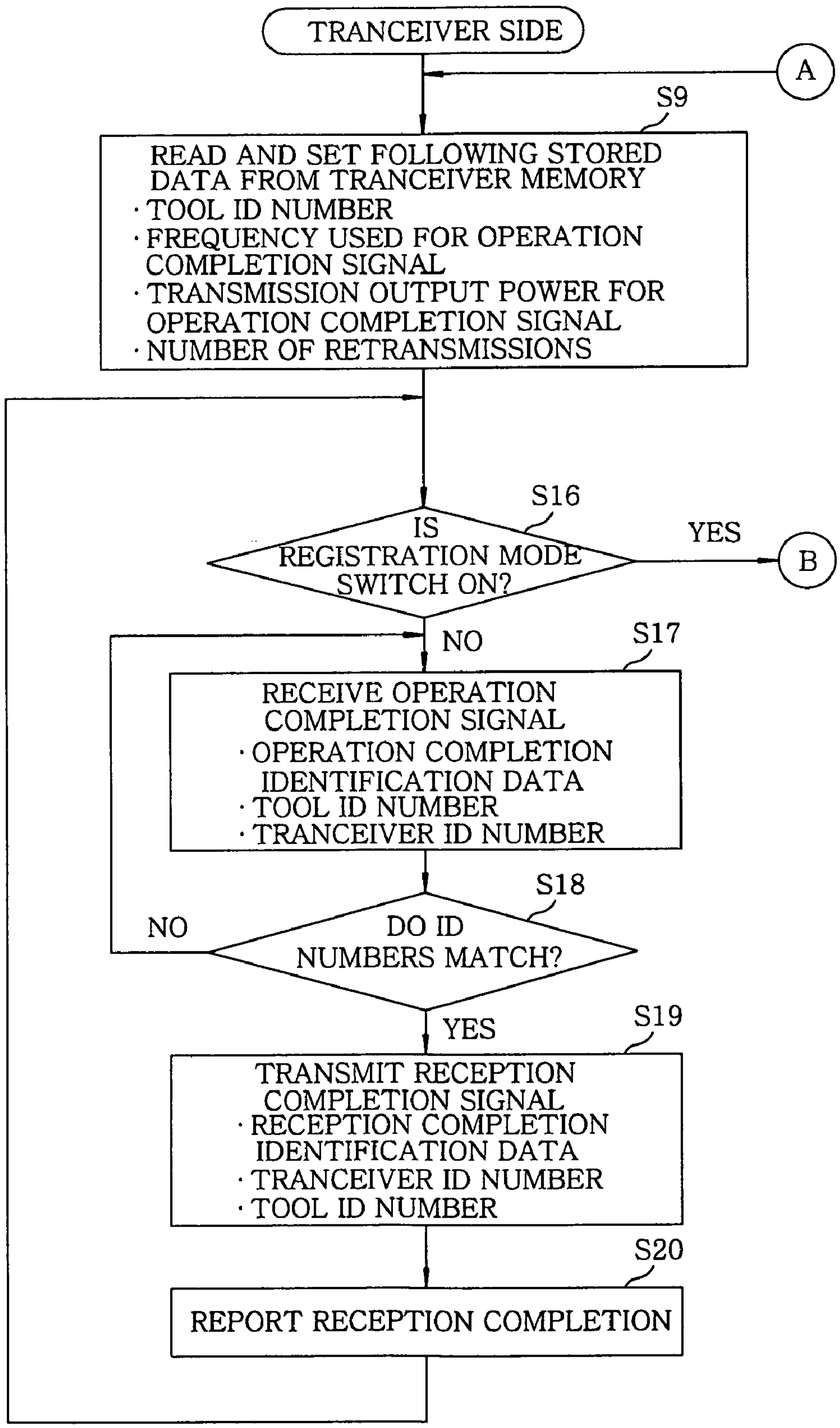
FIGS. 2A to 2C are an operational flowchart for a transceiver in accordance with the first embodiment of the present invention.
Figure 2B:
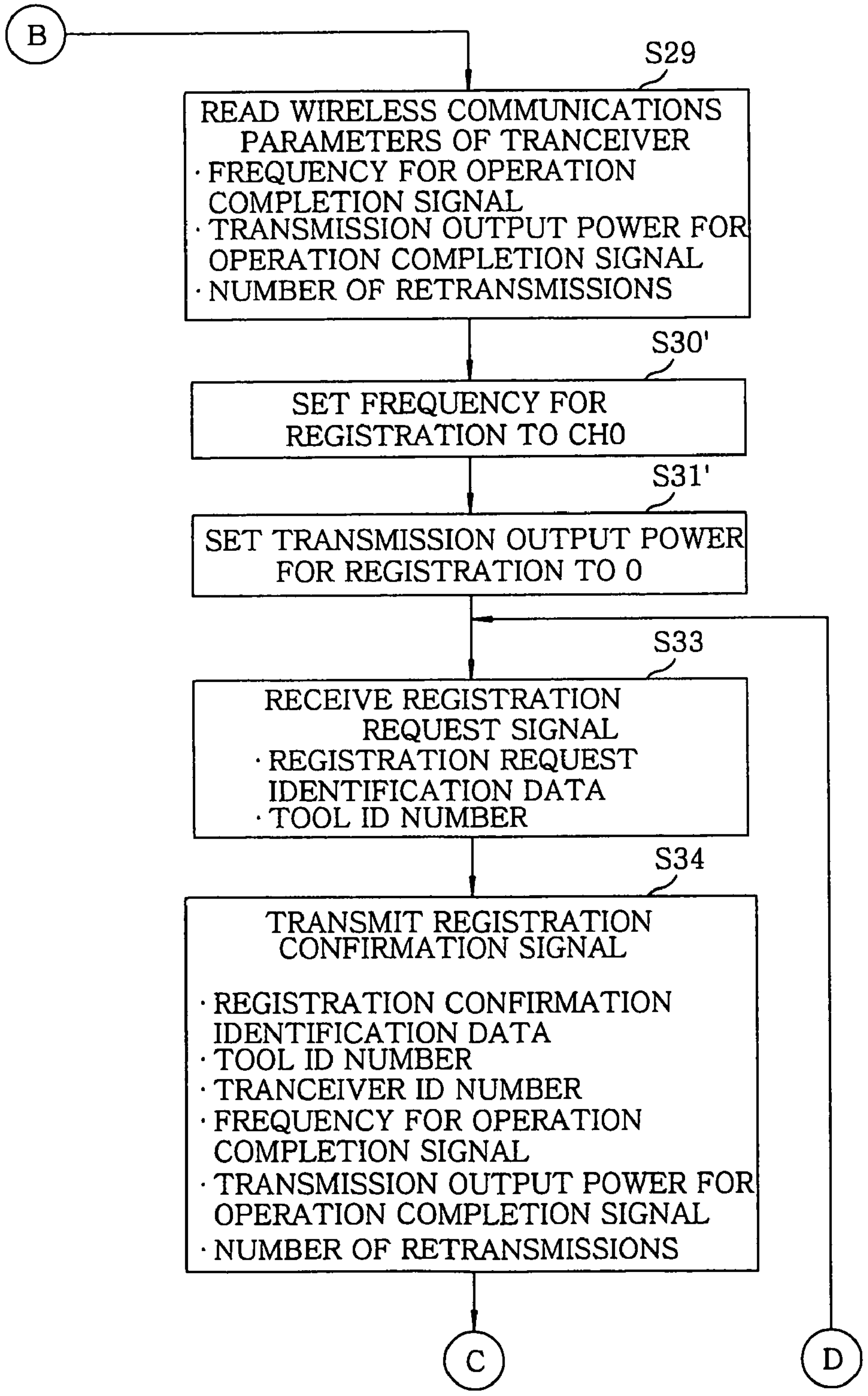
Figure 2C:
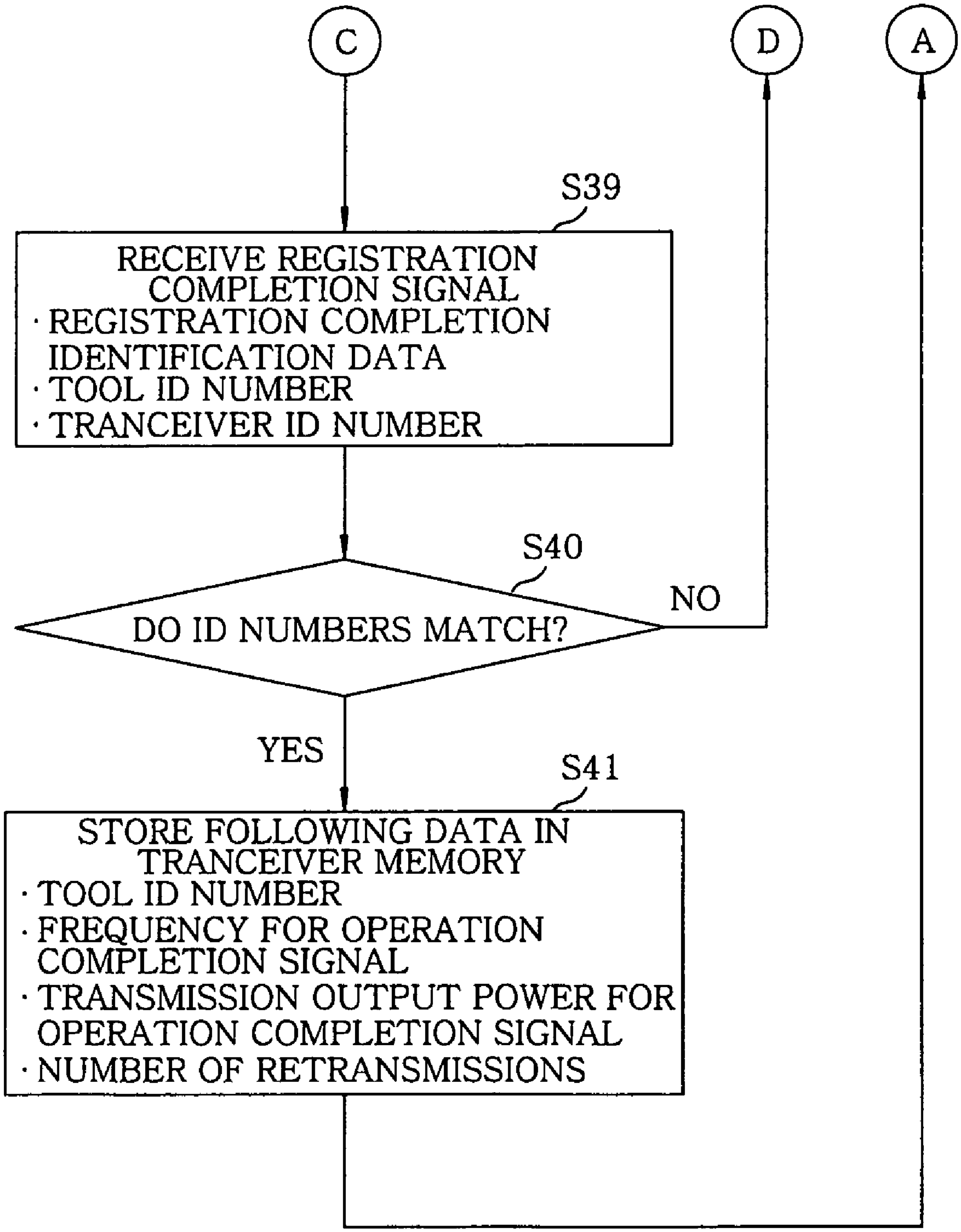

As shown in FIGS. 2A to 2C, if a registration mode switch, which is the mode setting unit 23, is not in the ON position (NO in step S16), the transceiver 2 receives the operation completion signal containing the operation completion identification data, the tool ID number, and the transceiver ID number in step S17. Then, the transceiver control unit 21 determines whether or not the transceiver ID number contained in the received operation completion signal matches with the ID number assigned to the transceiver 2 and whether or not the tool ID number in the operation completion signal matches with a registered tool ID number to be managed (step S18). If affirmative (Yes in step S18), a reception completion signal including reception completion identification data, the transceiver ID number assigned the transceiver 2, and the tool ID number is transmitted from the wireless communications unit 24 in step S19. After the reception completion signal is transmitted, a reception completion output is reported to the main body of the management device in step S20.

The tool control unit 15 that receives the reception completion signal in step S21 determines that transmission has been completed when the transceiver ID number and the tool ID number match with those stored in the nonvolatile memory (Yes in step S22). Thereafter, the process returns to the step S10 when the trigger switch 19 is OFF in step S23.

Further, if the ID numbers do not match with those stored in the nonvolatile memory (No in Step S22), retransmission is repeated a predetermined number of times. If the number of retransmissions is infinite, the above-described process is repeated until the tool control unit 15 determines that the transmission is completed in step S24. The retransmission time duration may be set instead of the number of retransmissions. Various operations can be processed in a factory and the like and the operation intervals can be various, too. Thus, if a system requires to attempt retransmission until wireless transmission is successful is required, the number of retransmission is set to an infinite value and, if otherwise, it is set to a certain number of retransmissions available in each operation interval, thereby improving overall performance of the wireless communications in each operation to the maximum extent.

Next, the registration mode will be described. Upon recognition of the ON states of the respective registration mode switches (mode setting unit 17 and 23), the tool control unit 15 and the transceiver control unit 21 make a transition to the registration mode, respectively (Yes in step S10 shown in FIGS. 1A to 1C and step S16 shown in FIGS. 2A to 2C).

Figure 1A:
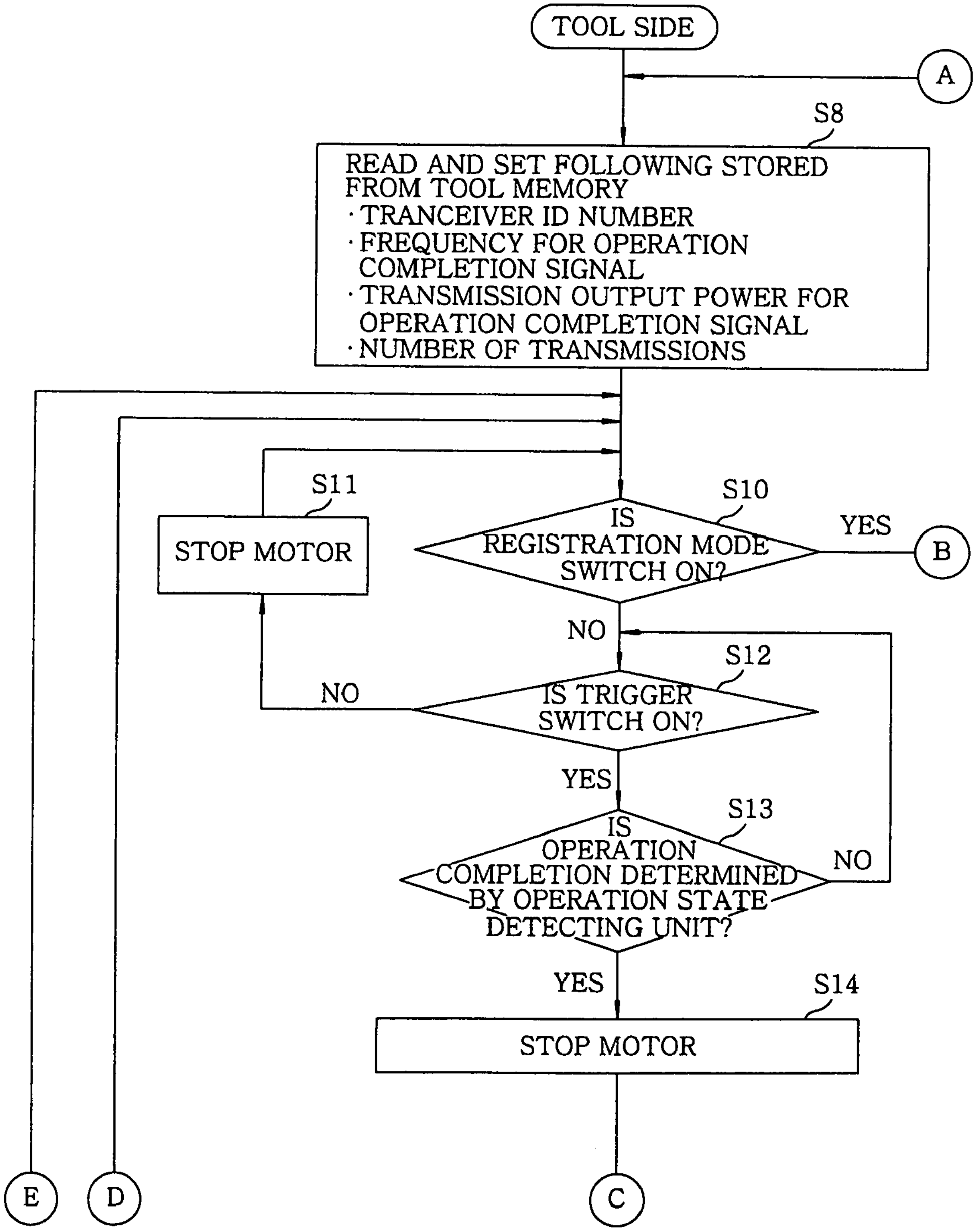
FIGS. 1A to 1C are an operational flowchart for a tool in accordance with a first embodiment of the present invention.
Figure 1B:
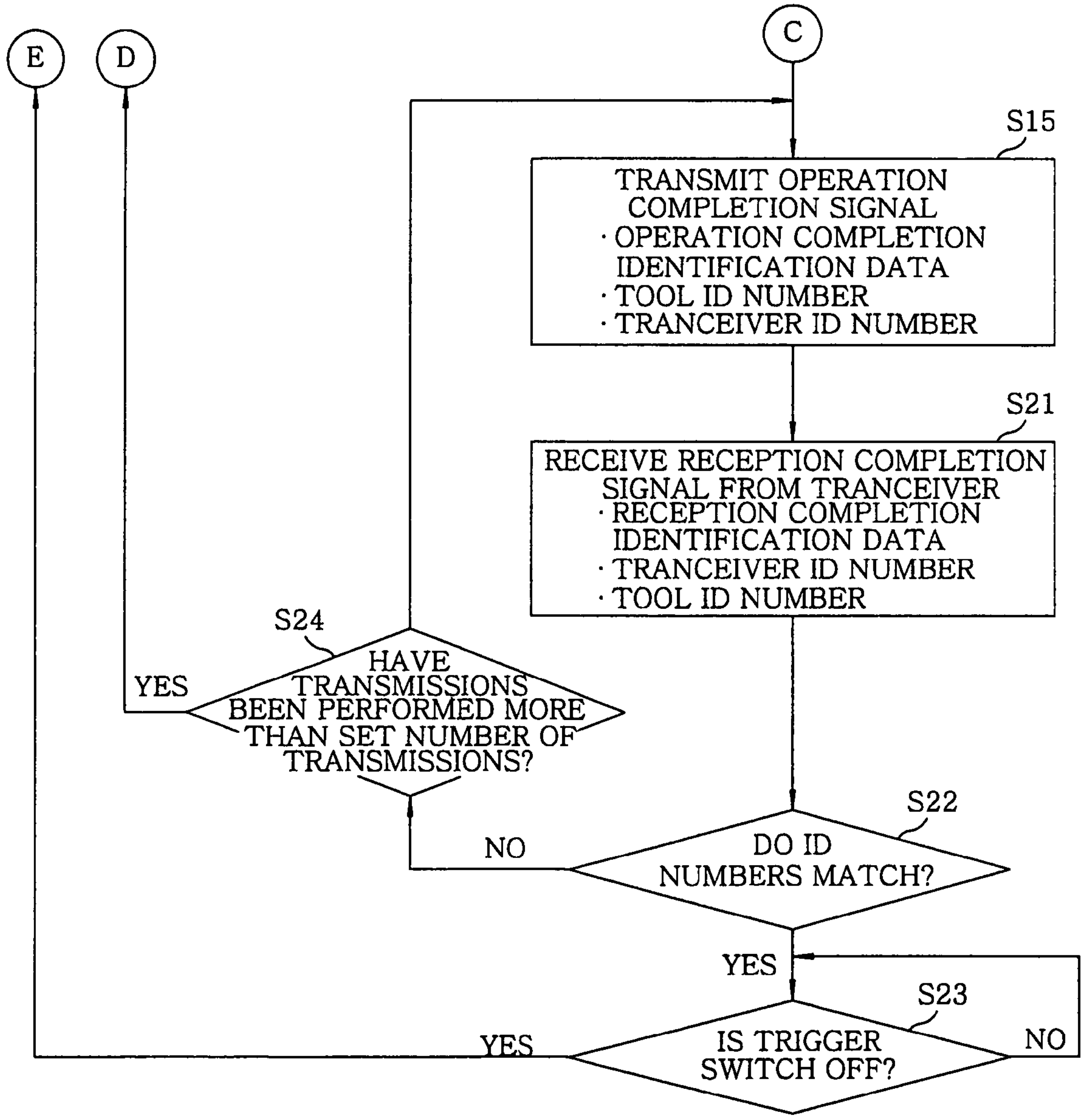
Figure 1C:
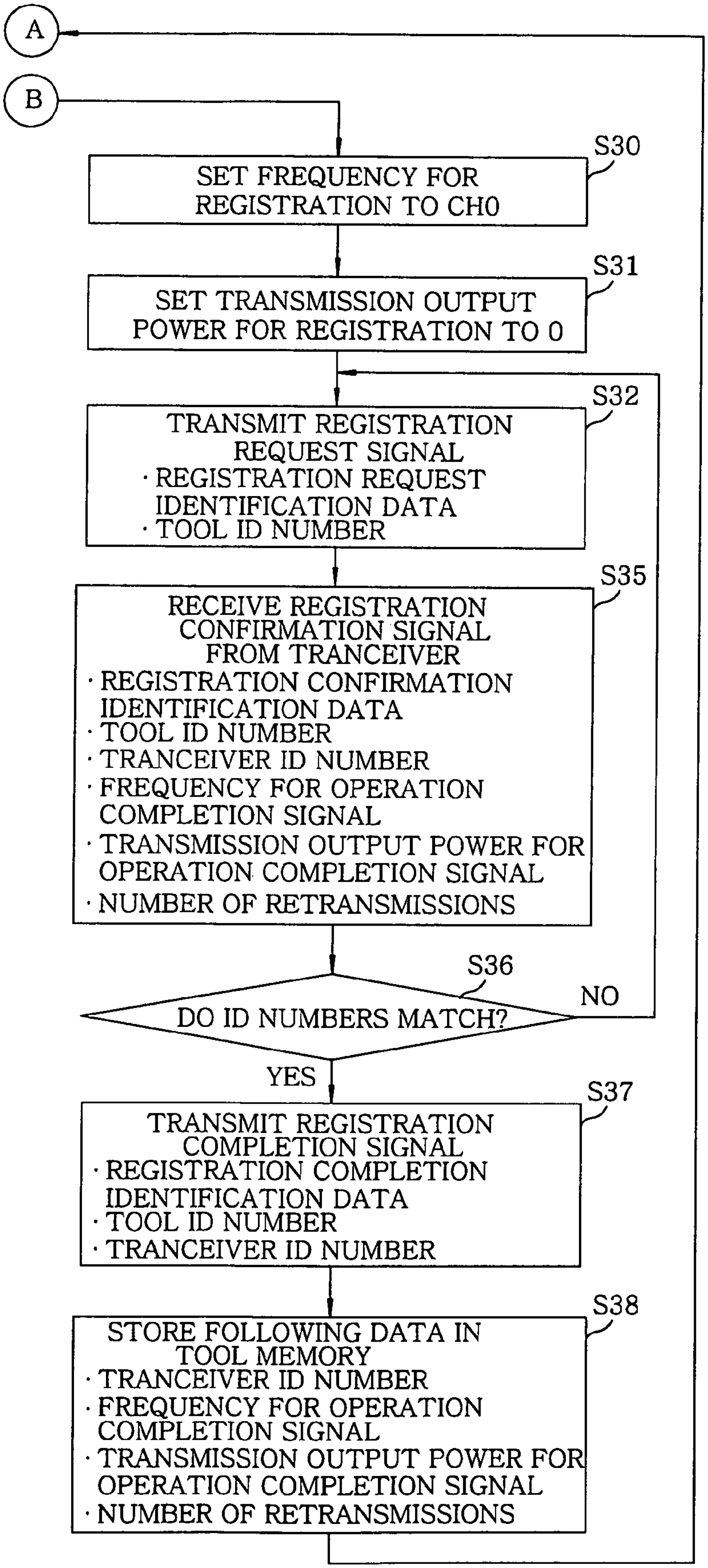

The tool control unit 15 in the registration mode sets a usable frequency to a frequency CHO dedicated to registration in step S30, and sets a transmission output power setting to 0 (minimum output) in step S31 (FIG. 1C). Meanwhile, as shown in FIG. 2B, the transceiver control unit 21 in the registration mode stores the wireless communications parameters set by the wireless communications parameter setting unit 22 in the nonvolatile memory provided in the transceiver control unit 21 (step S29), wherein the wireless communications parameters include a frequency for an operation completion signal, a transmission output power for the operation completion signal, and the number of retransmissions, and then performs steps S30' and S31'. The frequency dedicated to registration, which is different from the frequency for operation completion notification, is used to prevent same systems from being interfered with each other during a normal operation, and the transmission output power setting is set to 0 to suppress interferences with other systems using different frequency bands and to avoid adverse effects on the other systems.

Then, the tool control unit 15 in the registration mode sends a registration request signal containing registration request identification data and its own tool ID number in step S32 shown in FIG. 1C. The transceiver control unit 21, which receives this registration request signal in step S33 shown in FIG. 2B, reads out the frequency for the operation completion signal, the transmission output power for the operation completion signal, and the number of retransmissions that are set by the wireless communications parameter setting unit 22 including, for example, a DIP switch or the like, and transmits a registration confirmation signal containing the tool ID number included in the received registration request signal to the tool 1 in step S34 shown in FIGS. 2A to 2C.

This registration confirmation signal contains registration confirmation identification data, the transceiver ID number, the frequency for the operation completion signal, the transmission output power for the operation completion signal, and the number of retransmissions, as well as the tool ID number.

The tool control unit 15, which receives the registration confirmation signal in step S35 shown in FIGS. 1A to 1C, transmits a registration completion signal including registration completion identification data, the tool ID number and the transceiver ID number in step S37 when the ID numbers match (Yes in step S36), and after the transmission, stores the wireless communications parameters including the frequency for the operation completion signal, the transmission output power for the operation completion signal, and the number of retransmissions and the transceiver ID number in the nonvolatile memory in the tool control unit 15 in step S38.

If the ID numbers match (Yes in step S40 shown in FIGS. 2A to 2C), the transceiver control unit 21, which receives in step S39 the registration completion signal transmitted from the tool 1, stores the tool ID number and the wireless communications parameters in the nonvolatile memory provided in the transceiver control unit 21 in step S41. If the ID numbers do not match (No in step S40), the transceiver control unit 21 returns to the reception standby state (step S33) of a registration request signal and repeats the above-described process.

Second Embodiment

Figure 8:
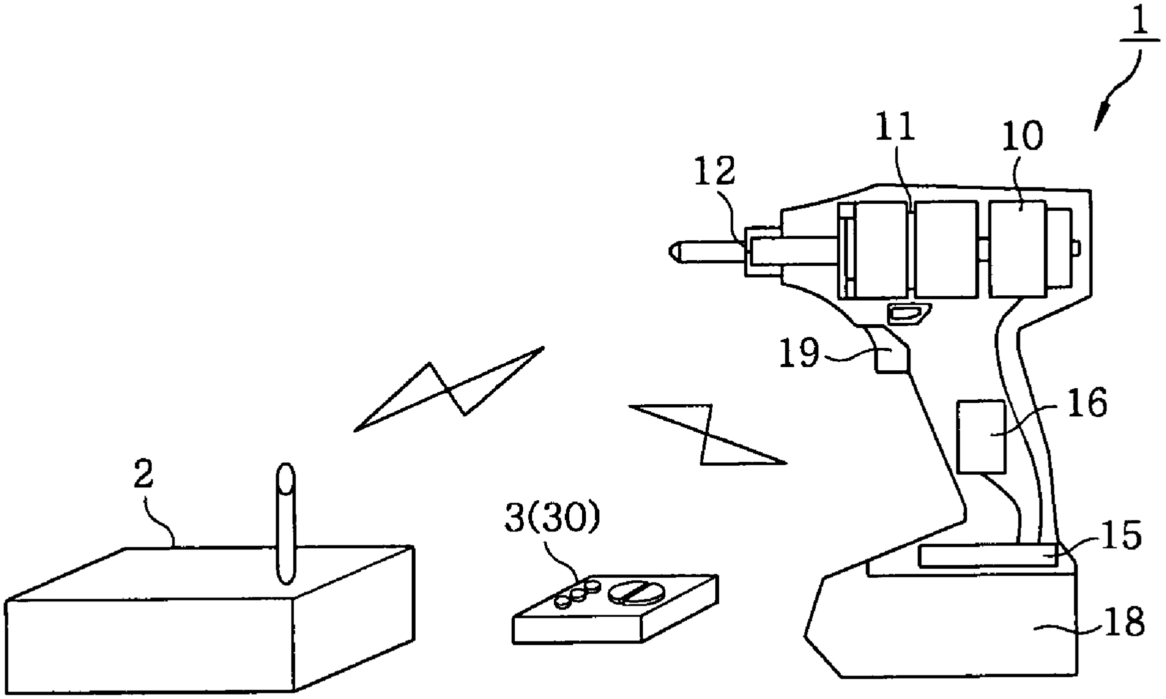
FIG. 8 is a schematic view of the second embodiment of the present invention.
Figure 9:
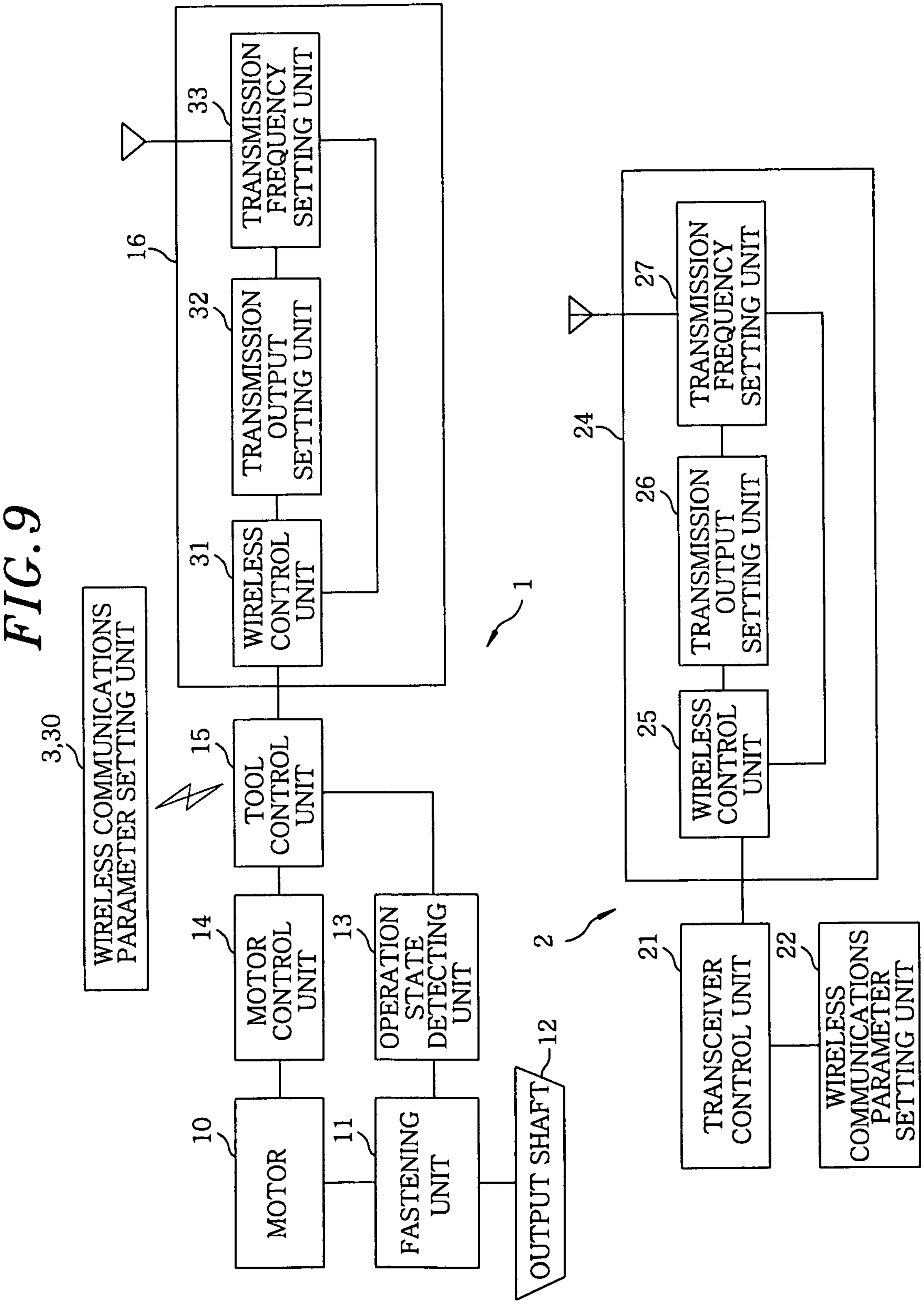
FIG. 9 is a block circuit diagram of the second embodiment of the present invention.

Although the basic configurations and functions of a second embodiment are the same as those of the first embodiment, the second embodiment of the present invention is different from the first embodiment in that the mode setting unit 17 (shown in FIG. 4) in the impact driver serving as a tool 1 is omitted and a remote controller 3 is included in the impact driver as shown in FIGS. 8 and 9, instead of the wireless communications parameter setting unit 22 shown in FIG. 4, so that a mode setting for the tool 1 and wireless communications parameters can be set and changed by the remote controller 3. Therefore, redundant description will be omitted, while distinctive configurations and functions will be described below. Further, like the wireless communications parameter setting unit 22, the remote controller 3 (a wireless communications parameter setting unit 30) includes, e.g., a DIP and the like to set wireless communications parameters to be described later.

The remote controller 3 of the tool 1 is a wireless type that performs signal transmission and reception to and from the tool control unit 15 by e.g., infrared communication and has a wireless communications parameter setting unit 30 therein. An example of the wireless communications parameters to be set is shown in FIGS. 5A to 5C. Here, a usable frequency for the operation completion signal, transmission output power for the operation completion signal and the number of retransmissions are referred to as the wireless communications parameters.

Hereinafter, operations in a wireless communications mode and in a registration mode in accordance with the present embodiment will now be described with reference to FIGS. 6A to 7B.

Figure 6A:
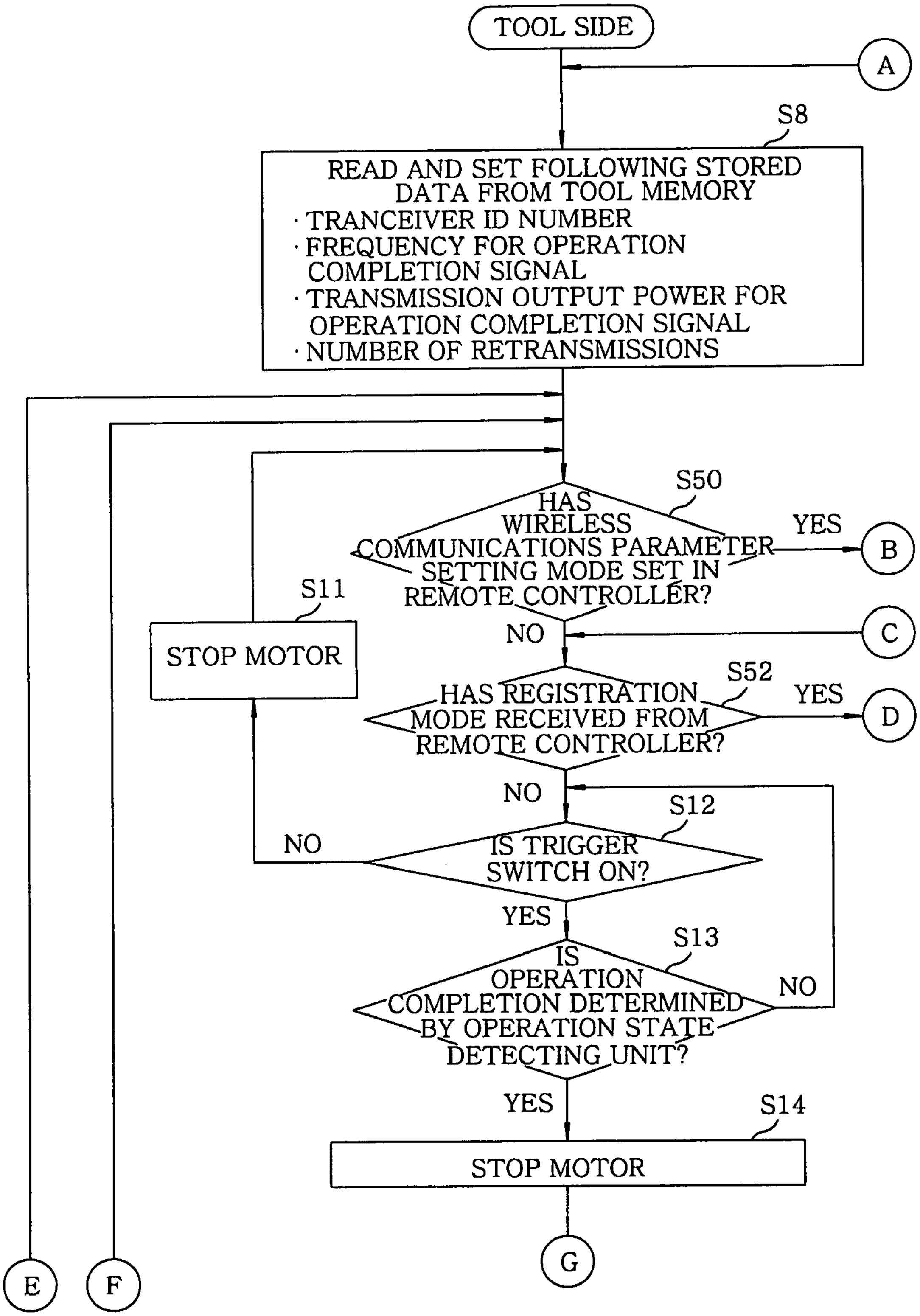
FIGS. 6A to 6C are an operational flowchart for a tool in accordance with a second embodiment of the present invention.
Figure 6B:
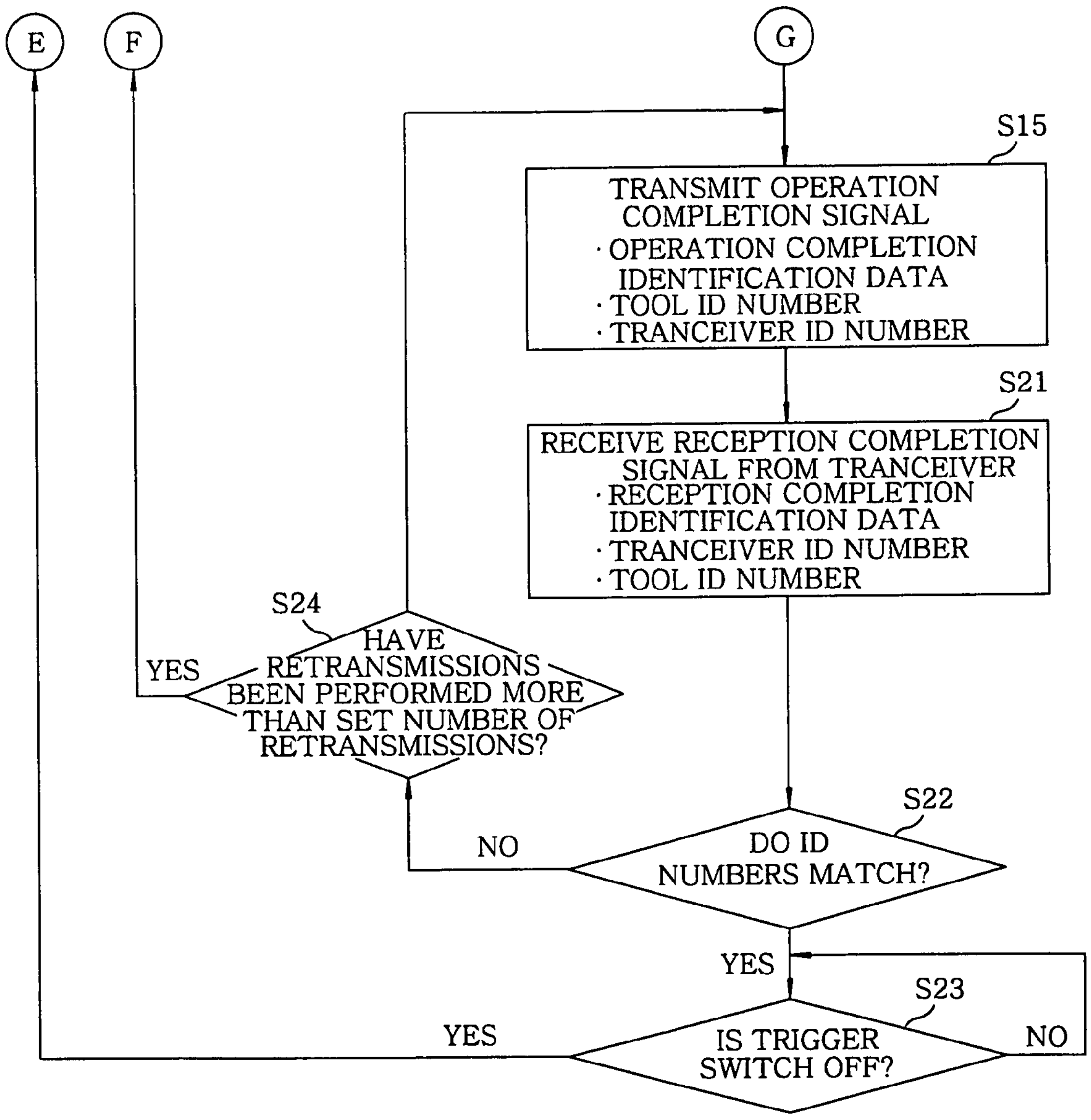
Figure 6C:
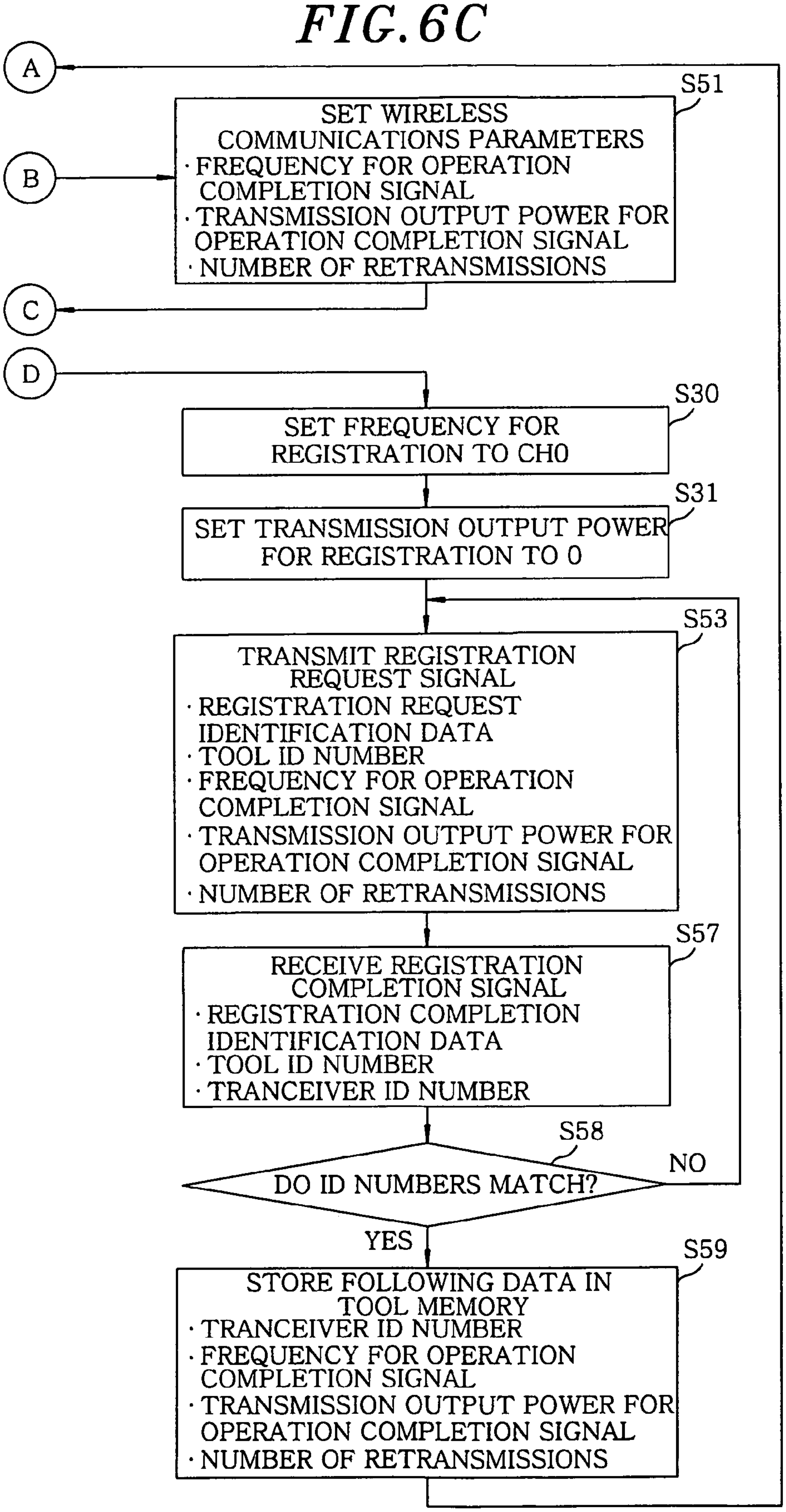

As shown in FIGS. 6A to 6C, if a wireless communications parameters setting mode is not set in the remote controller 3 (No in step S50) and the registration mode is not set by the remote controller 3 (No in step S52 of FIGS. 6A to 6C), the tool control unit 15 stops the motor 10 (step S11) when the trigger switch 19 is OFF (No in step S12), and the tool control unit 15 drives the motor 10 when the trigger switch 19 is ON (Yes in step S12).

Next, the changing of the settings of the wireless communications parameters by using the remote controller 3 will now be described. As shown in FIGS. 6A to 6C, in case when a wireless communications parameter setting mode is set in the remote controller 3 (Yes in step S50), the wireless communications parameters (frequency, output, and number of retransmissions) are set in advance in the remote controller 3 in step S51. Then, when a registration switch provided in the remote controller 3 is ON (Yes in step S52), the tool control unit 15, which receives the registration setting signal, make a transition to the registration mode and sets a usable frequency to a frequency CHO dedicated to registration in step S30, and sets a transmission output power setting to 0 (minimum output) in step S31.

Figure 7A:
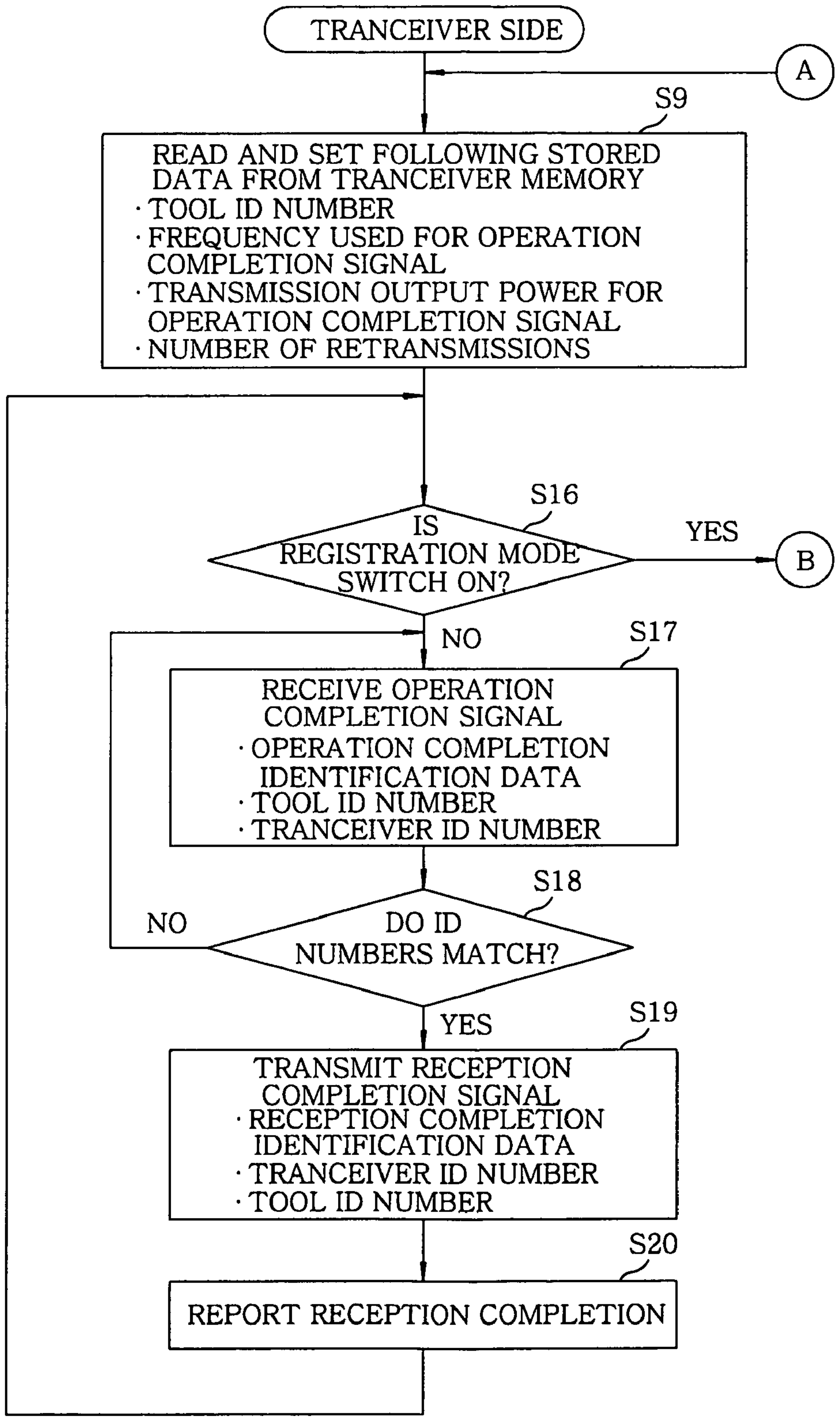
FIGS. 7A and 7B are an operational flowchart for a transceiver in accordance with the second embodiment of the present invention.
Figure 7B:
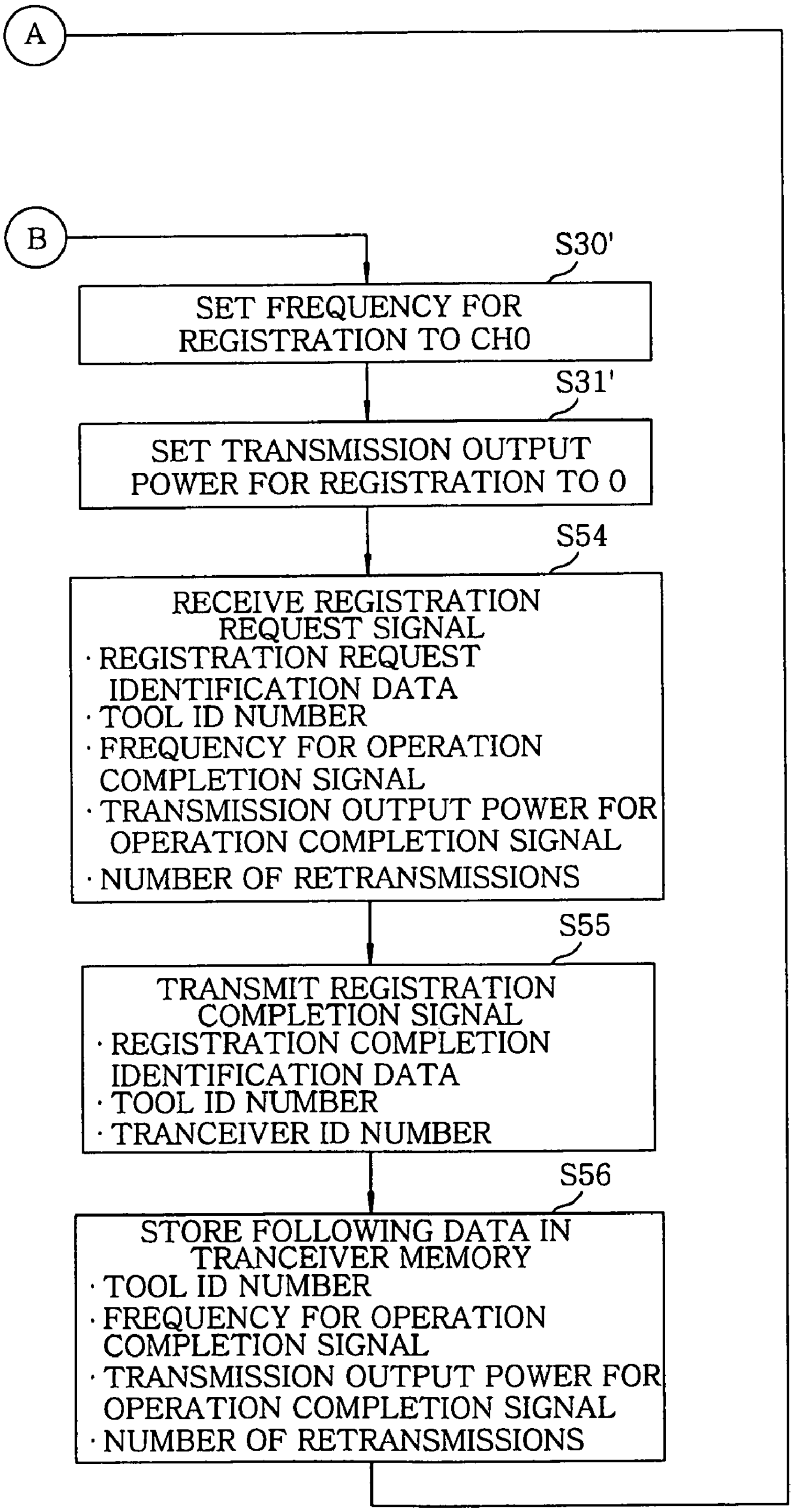

Meanwhile, as shown in FIGS. 7A and 7B, if the transceiver 2 is switched to the registration mode by the mode setting unit 23 (Yes in step S16), the transceiver 2 also sets a usable frequency to a frequency CHO dedicated to registration in step S30', and sets a transmission output power setting to 0 (minimum output) in step S31'.

Referring back to FIGS. 6A to 6C, the tool control unit 15 completes the step S31, and thereafter, sends a registration request signal containing registration request identification data, its own tool ID number, and the wireless communications parameters set in the remote controller 3 (step S53).

The tool control unit 15, which receives the registration request signal in step S54 shown in FIGS. 7A and 7B, transmits a registration completion signal containing registration completion identification data, a transceiver ID number, and a tool ID number in step S55. Further, in step S56, the tool control unit 15 stores the tool ID number and the wireless communications parameters contained in the registration request signal in the nonvolatile memory provided in the transceiver control unit 21, wherein the wireless communications parameters includes a frequency for an operation completion signal, a transmission output power for the operation completion signal, and the number of retransmissions.

The tool control unit 15 receives the registration completion signal transmitted from the transceiver 2 in step S57 shown in FIGS. 6A to 6C. When the ID numbers match (Yes in step S58), the tool control unit 15 stores the wireless communications parameters and the transceiver ID number in the nonvolatile memory in the tool control unit 15 in step S59. If the ID numbers do not match (No in step S58), a registration request signal is re-transmitted (step S53) and the above-described process is repeated.

Therefore, if the tool 1 and the transceiver 2 are switched back to the normal communications mode from the registration mode, wireless communications between the tool 1 and the transceiver 2 are achieved based on the wireless communications parameters newly stored in the nonvolatile memories of the respective control units 15 and 21.

Although the tool 1 is provided in a one-to-one relationship with the transceiver 2 in the foregoing first and second embodiments, multiple tools 1 having different tool ID numbers may be registered in a single transceiver 2 by repeating a registration operation and may communicate wirelessly with a single transceiver by setting wireless communications parameters. In this case, the number of transceivers 2 used for a process in a factory can be reduced, thereby saving the transceiver layout space and the costs.

Further, although the switching operation between the normal communications mode and the registration mode is performed by manipulating the remote controller 3 in the second embodiment, the mode setting unit 17 may be provided in the tool 1 to perform such switching operation.

While the invention has been shown and described with respect to the embodiments, it will be understood by those skilled in the art that various changes and modification may be made without departing from the scope of the invention as defined in the following claims.

What is claimed is:

1. A wireless communications system comprising:

a tool having a first wireless communications unit; and a transceiver having a second wireless communications unit to receive a signal transmitted from the first wireless communications unit, wherein the transceiver has a setting unit for setting wireless communications parameters for wireless communications between the first and the second wireless communications unit, and the tool has a tool control unit for setting in the first wireless communications unit the wireless communications parameters set by the setting unit and transmitted to the tool by wireless communication wherein the wireless communications parameters include at least one of a usable transmission frequency, a transmission output power and the number of retransmissions.

2. The system of claim 1, wherein a dedicated frequency is used to transmit the wireless communications parameters.

3. The system of claim 1, wherein the wireless communications parameters are transmitted at a transmission output power lower than that of normal communications.

4. The system of claim 1, wherein the transceiver communicates with a plurality of tools having their respective identification numbers.

5. The system of claim 1, wherein the usable transmission frequency is a frequency to be used to transmit an operation completion signal, the transmission output power is for transmitting the operation completion signal and the number of retransmissions is the number of transmissions of the operation completion signal to the transceiver.

6. The system of claim 1, wherein the wireless communications parameters include a usable transmission frequency, a transmission output power and the number of retransmissions.

7. The system of claim 6, wherein the usable transmission frequency is a frequency to be used to transmit an operation completion signal, the transmission output power is for transmitting the operation completion signal and the number of retransmissions is the number of transmissions of the operation completion signal to the transceiver.

8. The system of claim 1, wherein the wireless communications parameters include a usable transmission frequency, a transmission output power and the number of retransmissions.

9. The system of claim 8, wherein the usable transmission frequency is a frequency to be used to transmit an operation completion signal, the transmission output power is for transmitting the operation completion signal and the number of retransmissions is the number of transmissions of the operation completion signal to the transceiver.

10. A wireless communications system comprising:

a tool having a first wireless communications unit; and a transceiver having a second wireless communications unit to receive a signal transmitted from the first wireless communications unit, wherein the tool has a setting unit for setting wireless communications parameters for wireless communications between the first and the second wireless communications unit, the setting unit is a remote controller for the tool, and the transceiver has a transceiver control unit for setting in the second wireless communications unit the wireless communications parameters set by the setting unit and transmitted to the transceiver by wireless communications wherein the wireless communications parameters include at least one of a usable transmission frequency, a transmission output power and the number of retransmissions.

11. The system of claim 10, wherein a dedicated frequency is used to transmit the wireless communications parameters.

12. The system of claim 10, wherein the wireless communications parameters are transmitted at a transmission output power lower than that of normal communications.

13. The system of claim 10, wherein the transceiver communicates with a plurality of tools having their respective identification numbers.

14. The system of claim 10, wherein the usable transmission frequency is a frequency to be used to transmit an operation completion signal, the transmission output power is for transmitting the operation completion signal and the number of retransmissions is the number of transmissions of the operation completion signal to the transceiver.

* * * * *